United States Patent [19]
Oestreich

[11] Patent Number: 4,969,820
[45] Date of Patent: Nov. 13, 1990

[54] JAW MODEL

[76] Inventor: Gerd Oestreich, Wilhelmstr. 96, D-1000 Berlin 20, Fed. Rep. of Germany

[21] Appl. No.: 473,236
[22] Filed: Jan. 31, 1990

[30] Foreign Application Priority Data
Feb. 16, 1989 [DE] Fed. Rep. of Germany ........ 3904950

[51] Int. Cl.⁵ ............................................ G09B 9/00
[52] U.S. Cl. ..................................... 434/264; 433/213
[58] Field of Search ............... 434/264, 263; 433/213, 433/74; 446/337, 395

[56] References Cited
U.S. PATENT DOCUMENTS

| 961,262 | 6/1910 | Slough | 446/337 X |
| 3,704,519 | 12/1972 | Lystager | 433/213 |
| 4,720,265 | 1/1988 | Jacobi | 433/74 |
| 4,793,806 | 12/1988 | Elledge | 433/74 |
| 4,846,684 | 7/1989 | Oestreich | 434/263 X |

Primary Examiner—Richard J. Apley
Assistant Examiner—Rachel M. Healey
Attorney, Agent, or Firm—Mark P. Stone

[57] ABSTRACT

A jaw model for teaching and instruction purposes has at least one insert mounted in a recess of a mandibular arch. The insert is elongated in one dimension, and is movable into a functional position by rotation about a socket pin which is oriented substantially perpendicular to the elongated dimension of the insert. The socket pin is rotatably mounted, and within predetermined limits, longitudinally movable in a guide hole provided in a tongue or gum part of the jaw model.

9 Claims, 2 Drawing Sheets

JAW MODEL

BACKGROUND OF THE INVENTION

The invention relates to a jaw model for the demonstration of tooth-preserving and partial-prosthetic dental work as well as clinical pictures with at least one insert which is mounted in a recess of a mandibular arch and has on opposite sides of its periphery demonstration models of individual teeth, groups of teeth, edentate healthy and pathological mandibular arch sections, which can in turn be moved into a functional position by pivoting about an axis of rotation. From DE-PS No. 36 19 869 (corresponding to U.S. Pat. No. 4,846,684 issued July 11, 1989) a jaw model of the above type is known with an insert which has an axis of rotation which runs in the direction of the mandibular arch. The known jaw model is especially suitable for the demonstration of mandibular arch sections outside the anterior area whereas it is less suitable for the demonstration of anterior parts.

SUMMARY OF THE INVENTION

The aim of the invention is to produce a jaw model which is suitable in particular for the representation of tooth parts which are assigned to curved mandibular arch sections and makes possible a rapid exchange of demonstration models.

This aim is achieved in a jaw model of the generic type described in the introduction in that the axis of rotation is formed by a socket pin which is oriented approximately at right angles to the insert and is guided rotatably and movably in a guide hole in the tongue or gum part of the model, which hole opens into the recess.

The jaw model according to the invention is easy to handle and permits in a very confined space a rapid direct comparison of tooth preservation or tooth replacement alternatives and anomalies of a toothed or edentate mandibular arch, the demonstration models situated opposite one another in particular representing desired and actual states.

BRIEF DESCRIPTION OF THE DRAWINGS

The invention is explained in greater detail below with reference to the attached drawing, in which.

DESCRIPTION OF THE BEST MODES FOR CARRYING OUT THE INVENTION

Figure 1:
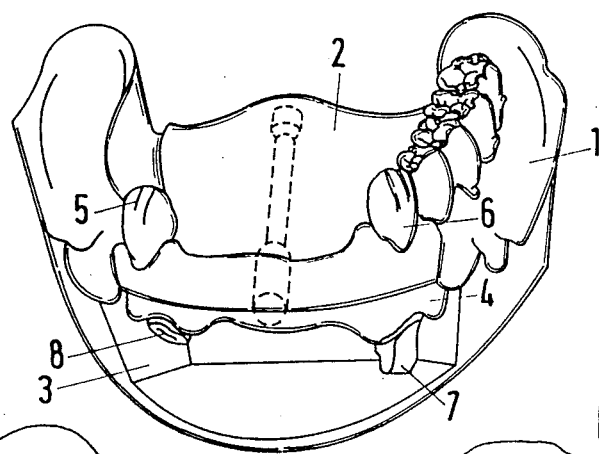
FIG. 1 shows a perspective view of a jaw model in an insert which is in the functional position.
Figure 2:
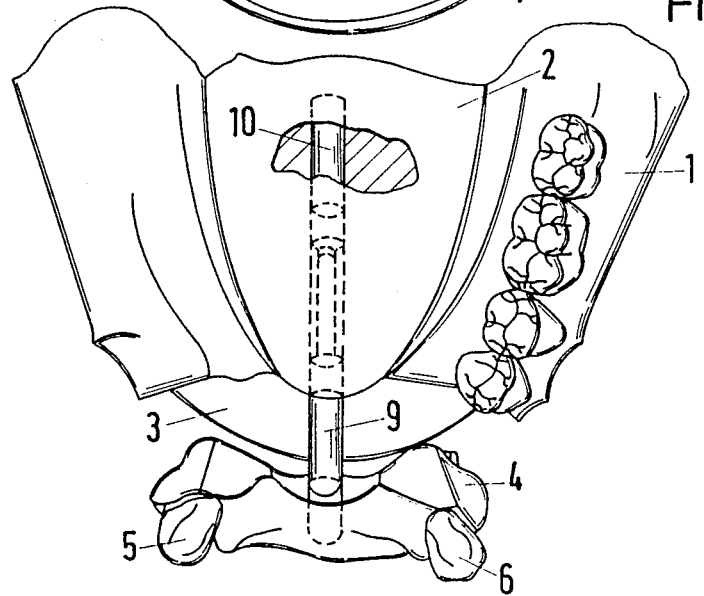
FIG. 2 shows a view from above of the jaw model with the insert moved into its pivoting position.
Figure 3:
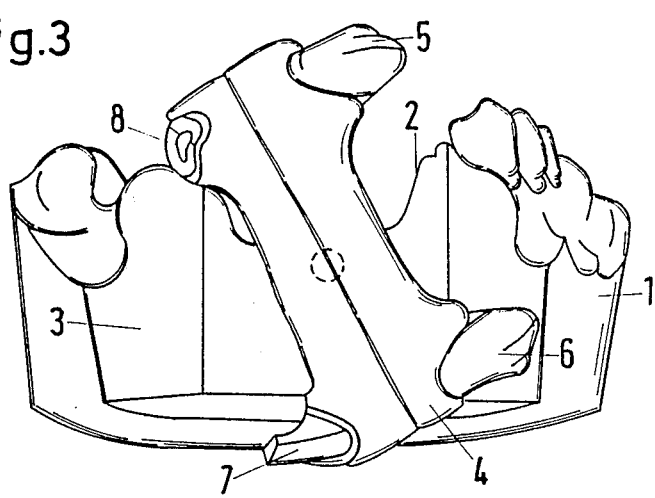
FIG. 3 shows a front view of the jaw model during the pivoting process of its insert.
Figure 4:
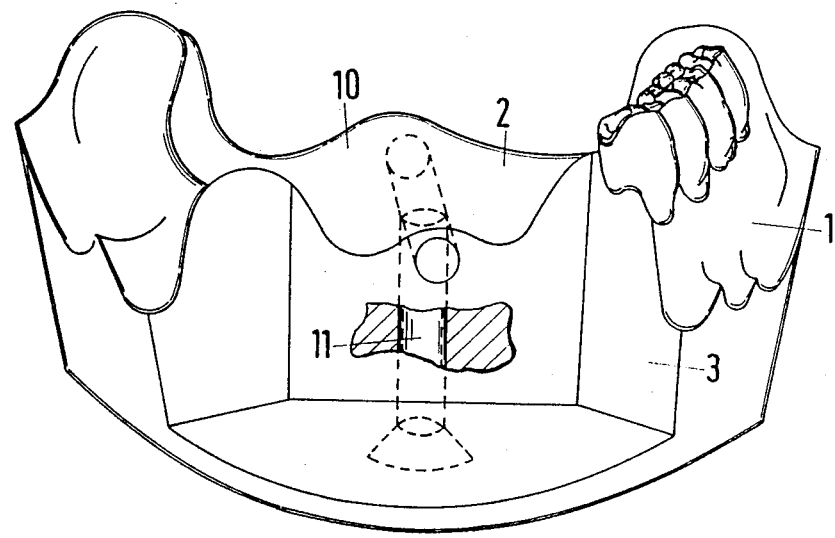
FIG. 4 shows the essential components of the jaw model according to FIGS. 1-3 in an exploded representation.
Figure 4:
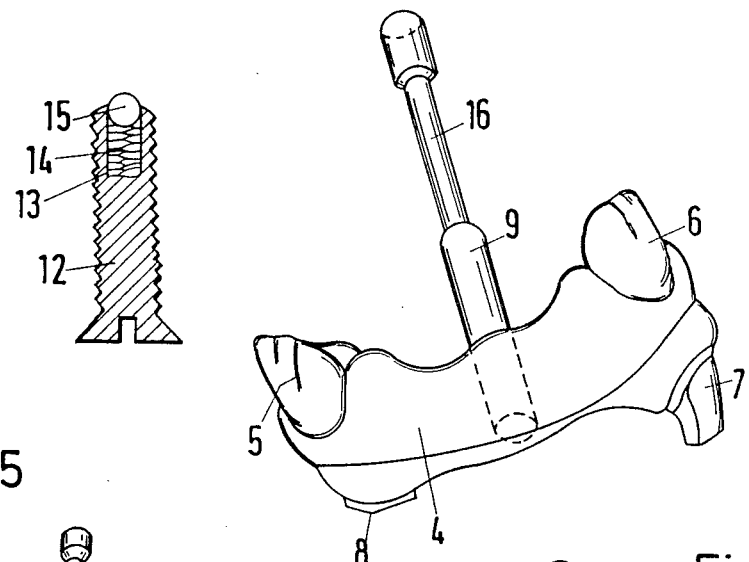

In FIG. 1, 1 is the mandibular arch, which surrounds a tongue part 2, of a jaw model which is provided with a recess 3 in the anterior jaw area. There is fitted into the recess 3 an insert 4 of which the demonstration model which is situated in the functional position displays a tooth 5, which is provided with a crown, and a post crown 6. The demonstration model which is situated out of the functional position, on the other hand, reveals the tooth 7, which has been prepared to receive a crown, and the root 8, which has been prepared to receive a post crown.

Figure 5:
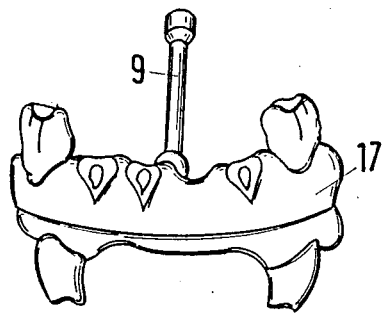
FIG. 5 shows a modified insert.
Figure 6:
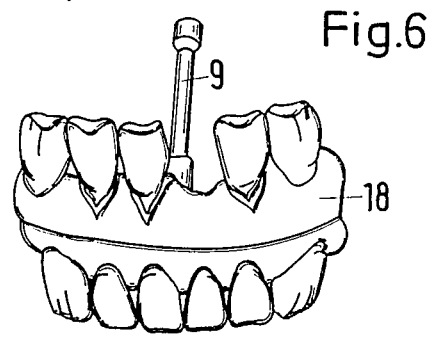
FIG. 6 shows a further modified insert.

In order to be able to bring about an exchange of the demonstration models, the insert is provided with a socket pin 9 which is guided in a drilled guide hole 10 of the tongue part 2. There opens into the guide drill hole 10 a threaded drill hole 11 which is open to the underside of the model and which serves to accommodate a screw 12. The screw 12 is provided, at its end which faces towards the guide hole 10, with a blind hole 13 for the accommodation of a spring 14 and for the mounting of a stop 15 which is formed by a ball. The stop 15 interacts with a section 16 of the socket pin 9, the diameter of which is smaller than the diameter of the remaining part of the socket pin 9 constituting a retaining shoulder or than the diameter of the guide drill hole 10. The length of the section 16 corresponds to the distance by which the insert 4 must be moved out of the recess 3 in order to be able to pivot it about the longitudinal axis of the socket pin 9. A further outward movement of the socket pin 9 is only possible by surmounting the force of the spring 14. This is carried out when the insert shown in FIGS. 1 to 4 is to be replaced with modified inserts of the type shown on reduced scale in FIGS. 5 and 6 in order to demonstrate different situations.

I claim:
1. Jaw model for the demonstration of tooth-preserving and prosthetic dental work as well as clinical pictures with at least one insert which is elongated in one dimension (4, 17, 18) which is mounted in a recess (3) of a mandibular arch (1) and has on opposite sides of its periphery demonstration models of individual teeth, groups of teeth, edentate healthy and pathological mandibular arch sections, which can in turn be moved into a functional position by pivoting about an axis of rotation, characterized in that the axis of rotation is formed by a socket pin (9) which is oriented approximately at right angles and perpendicular to the enlongated dimension of the insert (4, 17, 18) and is guided rotatably and movably in a guide hole (10) in the tongue or gum part (2) of the model, which hole opens into the recess (3).

2. Jaw model according to claim 1, characterized in that a stop (15) engages on the socket pin (9) and serves to limit its longitudinal movements.

3. Jaw model according to claim 2, characterized in that the stop (15) is spring-mounted in a drill hole (11) perpendicularly to the guide hole (10) for the socket pin (9).

4. Jaw model according to claim 2, characterized in that the socket pin (9) has between its two ends a section (16) with a reduced diameter, the length of which limits in conjunction with the stop (15) the longitudinal movement of the insert (4, 17, 18) out of the recess (3).

5. Jaw model according to claim 2, characterized in that the stop (15) can, for the purpose of exchanging the insert (4, 17, 18), be surmounted against the force of a spring (14).

6. Jaw model according to claim 3, characterized in that the stop (15) is formed by a ball.

7. Jaw model according to claim 2, characterized in that the stop (15) is mounted together with a spring (14), which presses it against a retaining shoulder, in a blind hole (13) arranged at the end of a screw (12) which is screwed into a threaded drill hole (11).

8. Jaw model according to claim 1 characterized in that the insert (4, 17, 18) forms an anterior jaw part.

9. Jaw model according to claim 2, characterized in that the insert (4, 17, 18) forms an anterior jaw part.

* * * * *